Feb. 26, 1963  R. M. DYKSTERHOUSE  3,079,476
SWITCH FOR TURN INDICATING CIRCUITS
Filed June 23, 1958  2 Sheets-Sheet 1
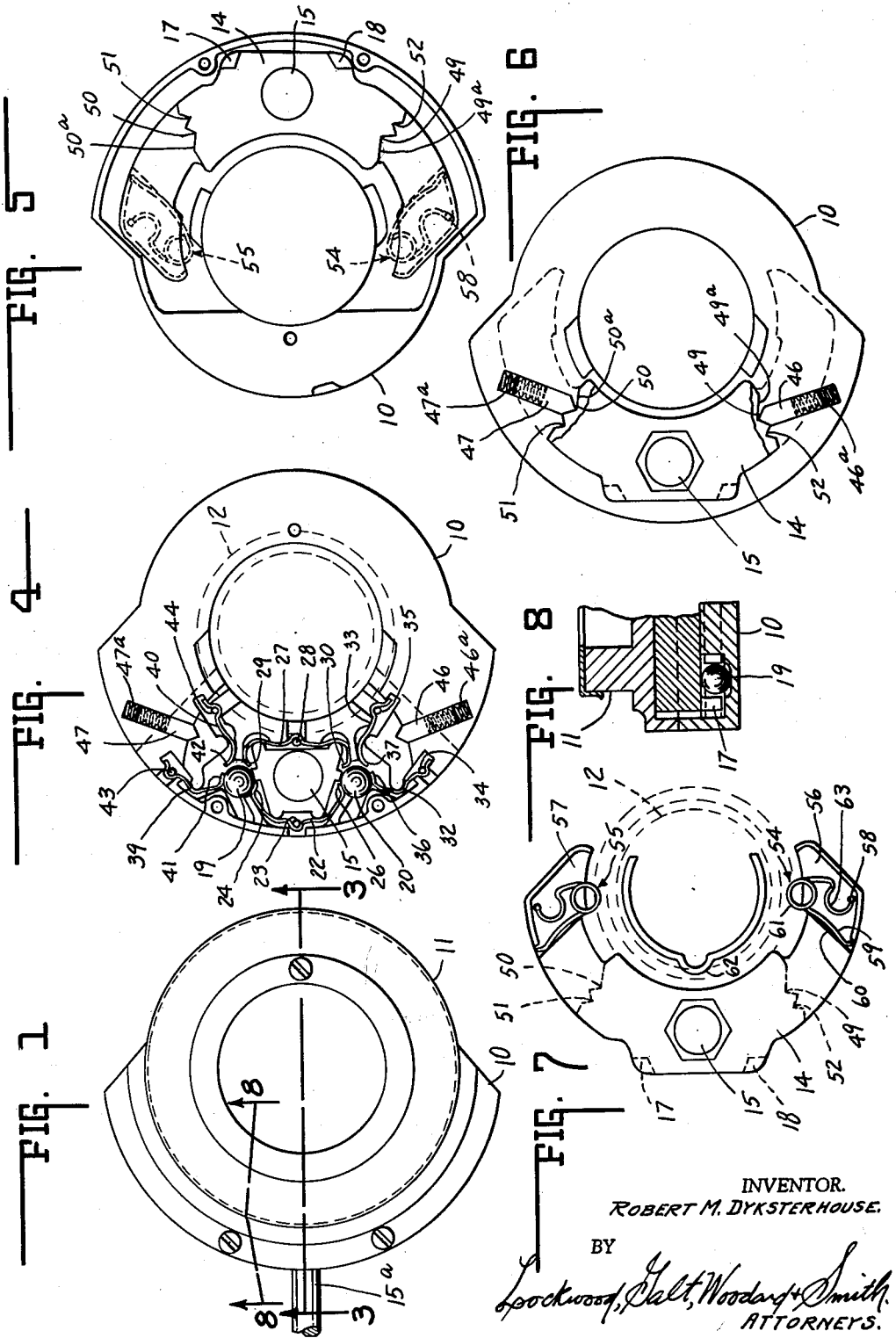
INVENTOR.
ROBERT M. DYKSTERHOUSE.
BY
Lockwood, Galt, Woodard & Smith
ATTORNEYS.

Feb. 26, 1963   R. M. DYKSTERHOUSE   3,079,476
SWITCH FOR TURN INDICATING CIRCUITS
Filed June 23, 1958   2 Sheets-Sheet 2
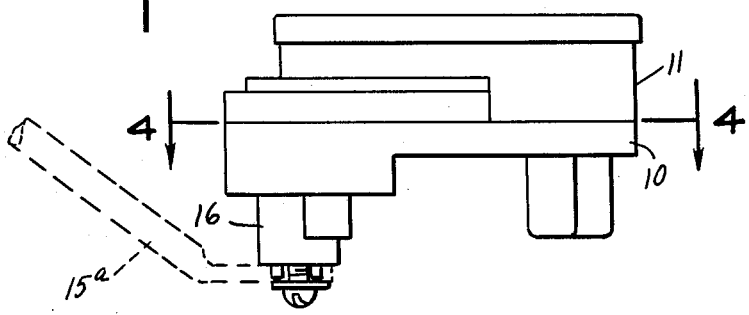
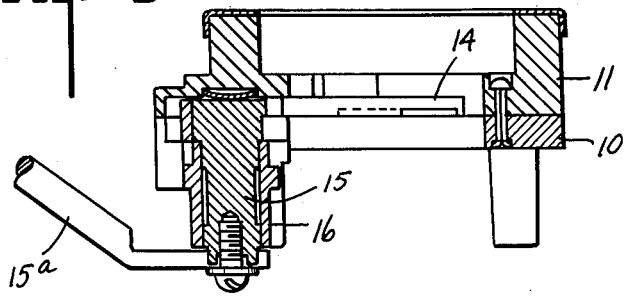
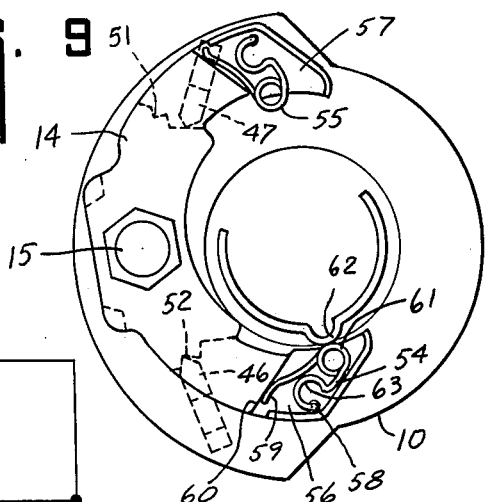
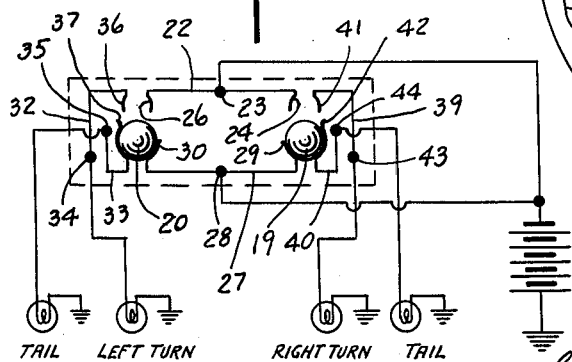
INVENTOR.
ROBERT M. DYKSTERHOUSE.
BY
Lockwood, Galt, Woodard & Smith
ATTORNEYS.

United States Patent Office 3,079,476
Patented Feb. 26, 1963

3,079,476
SWITCH FOR TURN INDICATING CIRCUITS
Robert M. Dyksterhouse, Charlevoix, Mich., assignor to Model Engineering and Manufacturing Company, Huntington, Ind., a corporation
Filed June 23, 1958, Ser. No. 743,895
10 Claims. (Cl. 200—61.3)

The present invention relates to an electrical switch and more particularly to a switch adapted to operate a directional turn indicating circuit for vehicles while being equipped with simple integrated cancelling mechanism. More particularly the switch of the present invention constitutes a plural selective contact arrangement employing conducting balls to establish selected contact and wherein the balls move in an arcuate path.

The innovation of directional turn indication equipment in automobiles carries with it a safety motivation. In such equipment where human life depends upon the trouble-free operability of the system there have been many modifications and improvements suggested and used for the purpose of eliminating faulty operation and accidents caused thereby.

Conventional turn indication equipment is subject to a number of faults. For example, the turn indication equipment may jam and jam the steering mechanism of the automobile, thereby causing loss of control of the automobile. There are less serious faults such as failure of the cancelling mechanism to reset the switch to a neutral position for stopping the flashing of the turn indication lamp. Other faults relate to broken contact springs and fouled electrical contact whereby the turn indication lamp fails to indicate a turn when the switch is operated.

Many of the conventional directional turn indicating equipments have been designed to present a specific switching means for curing the various types of faults described herein or they have been designed to present a specific cancelling means, or a specific cancelling means for use in association with specific switch structure. Few of the conventional devices comprise switching structure and cancelling structure which is integrated to provide a device having a simple and foolproof construction. The conventional devices are usually extremely complicated mechanisms with the operational limitations that accompany complexity. Also the conventional mechanisms are relatively expensive and require special adaptation to automobiles manufactured by individual manufacturers.

The invention presented herein is a modification of that described in my copending application for United States Letters Patent entitled "Ball Contact Switch," filed June 23, 1958, and bearing Serial Number 743,894, now Patent No. 2,978,554, and assigned to the assignee hereof. The present invention resembles that disclosed in said application in that it employs balls as contact making devices. Whereas, the switch disclosed in said patent application operates on push button principle, the presently disclosed invention employs balls moving in an arcuate path, and the switch structure comprises an interlocked laminar switch case. An integrated cancelling mechanism is provided within the switch case and cooperates directly with the steering shaft in the steering column of a conventional automobile whereby mounting of the directional turn signal equipment is facilitated and installation and replacement is relatively simple.

The principal object of the present invention is the provision of a simple directional turn indicator device which includes cancelling mechanism and moving ball contacts.

Another object is to provide an integrated switch and cancelling mechanism readily attachable to the steering column of automobiles for controlling a directional turn indicating circuit.

Another object of the present invention is to provide a laminar switch case structure in which each of the sandwich layers cooperate with each other to provide integrated actuation, switching, and cancelling.

Still another object of this invention is to provide an improved switching means wherein the moving contactor member is arranged to provide a wiping action at the contact points and wherein the inherent spring pressure in the contactor system supplements forces created by the cancelling mechanism and/or by the manually operated actuator to create snap action within the contactor system and to facilitate operation of the contactor system through its operational cycle.

A further object of this invention is to provide a directional turn indicator device having structure of such character that any malfunction thereof will have no effect on operation of the vehicle steering mechanism.

A still further object of this invention is to provide in a directional turn indicator device a mechanism adapted inherently to so balance the operational forces within said devices that much less force is required to cancel a turn indication than is required to initiate a turn indication.

In accordance with this invention there is provided a directional turn indicator device comprising a base member, an electrical switch having alternately operable contact assemblies mounted therein, each assembly including a ball member mounted for movement into and out of engagement with cooperating contact members, an actuator member pivotally mounted on said base for oscillation into turn indicating positions for operative engagement with one or the other of said ball members, detent mechanism operatively associated with said base and said actuating element for retaining said actuating element in a neutral position or in one of its turn indicating positions, cancelling means mounted on said actuating element for cooperation with a vehicle steering mechanism for resetting said actuating element after a turn of said vehicle is completed, and an upper case mounted over said base for enclosing the members supported thereon.

The full nature of the invention will be understood from the accompanying drawings and the following description and claims:

FIG. 1 is a top plan view of the switch as provided in accordance with this invention.

FIG. 2 is a side elevation of the switch shown in FIG. 1.

FIG. 3 is a cross section taken generally on line 3—3 of FIG. 1.

FIG. 4 is a cross section taken generally on line 4—4 FIG. 2.

FIG. 5 is a bottom plan of the cover and switch actuator.

FIG. 6 is similar to FIG. 4 but illustrates the switch actuating element in operative relation with the contact assembly and has parts broken away to illustrate cooperation of the actuator with the detent mechanism.

FIG. 7 is a top plan view of the actuator element illustrated in cooperative relation with the automotive steering mechanism.

FIG. 8 is a partial cross section taken on line 8—8 of FIG. 1.

FIG. 9 is similar to FIG. 7 and illustrates the actuator element in position to indicate a left turn.

FIG. 10 is a circuit diagram illustrating the operative relationship of the invention with a typical automotive light system.

The integrated directional turn indicating switch of this invention includes a base member 10 and a cover member 11, the complete assembly of which is intended to be mounted coaxially with the steering shaft 12 (FIG. 7) of a vehicle. The switch actuating member 14 is pivotally mounted within the base 10 by means of a shaft 15 rotatably mounted within the boss 16 of the base 10. Actuator 14 is provided with a handle 15a for manual operation and pair of switch operating dogs 17 and 18 which project downwardly into operative engagement with the ball contactors 19 and 20 respectively.

The base 10 is formed of conventional thermoplastic materials and is provided with a first recess for receiving a double ended contact spring 22 electrically connected to the binding post 23 and having a first contact end 24 cooperating with ball 19 and the second contact end 26 cooperating with ball 20. The base 10 is also recessed as shown to receive a second double ended contact spring 27 electrically connected with a binding post 28 and having a first contact end 29 cooperating with ball 19 together with a second contact end 30 cooperating with ball 20. The base 10 is also recessed to support a pair of contact springs 32 and 33 electrically connected respectively with binding posts 34 and 35 and having contact ends 36 and 37 respectively. A second pair of contact springs 39 and 40 are mounted within suitable recesses in base 10 as shown in FIG. 4 and their respective contact ends 41 and 42 respectively cooperate with ball 19. Binding posts 43 and 44 provide electrical connections with springs 39 and 40 respectively. It should be noted that all of the spring contact members are bent into the desired shape when they are forced into their respective recesses in base 10. This method of mounting makes it unnecessary to preform the contact springs before they are mounted in the base 10.

From the foregoing description it will be apparent that the dog 17 of actuator 14 cooperates with ball 19 whereby clockwise rotation of actuator 14 moves ball 19 to the right (FIG. 4) rolling it out of contact with the end 24 of spring 22 and into contact with the ends 29 and 42 of springs 27 and 40 respectively. Contact is thereby established between end 41 of spring 39 and the contact ends of springs 27 and 40. Similarly, dog 18 of actuator 14 cooperates with the ball 20 when the actuator is rotated in a counterclockwise direction thereby to establish electrical contact between the contact ends of springs 27, 32 and 33. In this manner actuator 14 serves to effect the initiating of a signal indicating either a right turn or a left turn. The rolling action of the balls 19 and 20 provides a wiping of the ends of the respective contact springs and of the ball surfaces which serves to prevent the balls from becoming flattened through wear and also prevents the accumulation of an oxidized coating on the contact surfaces thereby to insure foolproof operation of the contacts.

Referring to FIGS. 4, 5, 6 and 7, the actuator 14 is normally retained in a neutral position with the dogs 17 and 18 in position to engage either of the balls 19 or 20 respectively by means of detents 46 and 47 slidably mounted in slots molded in the base 10 as illustrated in FIGS. 4 and 6. Detents 46 and 47 are urged, by means of springs 46a and 47a respectively, into contact with neutral position notches 49 and 50 formed in actuator 14 as shown in FIGS. 5, 6 and 7. Actuator 14 is also provided with what may be termed a relatively shallow right turn notch 51 and a relatively shallow left turn notch 52 whereby clockwise rotation of actuator 14 causes detent 47 to ride out of notch 50 and into notch 51. Simultaneously, the detent 46 rides only partially out of the notch 49. The surface 49a of notch 49 and the surface 50a of notch 50 lie at a relatively wide angle to the axes of the detents whereby the surfaces are substantially longer than the opposite surfaces of the notches. In this manner detent 47 holds actuator 14 in the right turn indicating position while detent 46 is exerting a force on surface 49a of notch 49 which tends to cause the actuator to return to its neutral position. At the same time, ball 19 will have been moved into contact with the contact ends of springs 27 and 40 which has the effect of spreading these contact ends to a certain predetermined degree.

Thus, these contact ends exert a force on ball 19 which is transmitted to the dog 17 to actuator 14 also tending to return actuator 14 to its neutral position. The combined forces of contact springs 27 and 40 and the force exerted by spring 46a on detent 46 make it possible to return the actuator to its neutral position using a force equivalent to twenty-five percent (25%) of the original actuating force.

For cancelling a turn indication and returning actuator 14 to its neutral position, there are provided cancelling springs 54 and 55 nested within the recesses 56 and 57 respectively at opposite ends of actuator 14. Spring 54, for example, is provided with an end member 58 anchored within a suitable hole provided in actuator 14. The opposite end 59 is flexed into forceable contact with the wall 60 of the recess whereby the loop portion 61 projects inwardly toward the cam 62 which may be fixed to the steering shaft of the vehicle. When the actuator is in its neutral position, cam 62 rotates freely without the engaging either of the springs 54 and 55. However, when the actuator is moved in a counterclockwise direction, for example, the loop 61 of spring 54 will be in the path of movement of cam 62. As the steering wheel and shaft of the vehicle are rotated in executing a turn, cam 62 contacts loop 61 and flexes the spring 54, particularly at its curved section 63. In this manner cam 62 may slip over loop 61 without moving the actuator 14, dog 46 being in engagement with notch 52. When the vehicle turn is completed the cam 62 rotates in a clockwise direction and into contact with loop 61. In this case, however, spring 54 is in firm engagement with wall 60 and cannot slip out of the way of cam 62. Therefore, the actuator 14 is returned to its neutral position.

If for some reason actuator 14 becomes jammed in a left turn position, for example, the motion of the steering wheel and steering shaft will not be locked because an excessive amount of force on spring 54 will cause it to flex especially at its curved portion 63 to permit cam 62 to slip over loop portion 61 and return to its normal position as shown in FIG. 7. If the actuator 14 is not jammed, cam 62 will cause return of the actuator to its neutral position with little or no noticeable reaction in the steering wheel. This is by reason of the fact that only twenty five percent (25%) of the original actuating force is required to return the actuator to its neutral position. From the foregoing description it will be readily apparent that spring 55 will function in the same manner as spring 54 when the actuator is moved in a clockwise direction to initiate a signal indicating a right turn.

The invention claimed is:

1. A directional turn indicator device comprising a base member, an electrical switch having alternately operable contact assemblies mounted therein, each assembly including a ball member mounted for movement into and out of engagement with cooperating contact members, an actuator pivotally mounted on said base for oscillation into alternative turn-indicating positions for operative engagement with one or the other of said ball members, detent mechanism operatively associated with said base and said actuator for retaining said actuator in a neutral position or in one of its turn indicating positions, cancelling means mounted on said actuator for cooperation with a vehicle steering mechanism for resetting said actuator after a turn of said vehicle is completed, and an upper case mounted over said base for enclosing the members supported thereon.

2. A directional turn indicator device comprising a base member, an electrical switch having alternately operable contact assemblies mounted therein, an actuator pivotally mounted intermediate its ends on said base for oscillation into alternative turn-indicating positions for operative engagement with one or the other of said contact assemblies, each of the ends of said actuator having a neutral position notch and a turn indicating position notch, detent mechanism operatively associated with said base and the notches of said actuator for retaining said actuator in a neutral position or in one of its turn indicating positions, and cancelling means mounted on said actuator, said means including springs having projecting portions for engagement with a vehicle steering mechanism and said springs being disposed in said actuator to provide low resilient resistance to engagement of said steering mechanism in one direction of movement of said mechanism and substantially higher resilient resistance to movement of said mechanism in an opposite direction such that said cancelling means is normally operative by said mechanism for resetting said actuator after a turn of said vehicle is completed and selectively inoperative for resetting said actuator when said actuator is jammed.

3. A directional turn indicator device comprising a base member, an electrical switch having alternately operable contact assemblies mounted therein, an actuator pivotally mounted intermediate its ends on said base for oscillation into alternative turn-indicating positions for operative engagement with one or the other of said contact assemblies, each of the ends of said actuator having a neutral position notch and a turn indicating position notch, detent mechanism operatively associated with said base and the notches of said actuator for retaining said actuator in a neutral position or in one of its turn indicating positions, and flexible cancelling springs mounted on opposite ends of said actuator and having extending coils for cooperation with a vehicle steering mechanism, the opposing cancelling springs being disposed on said actuator with their extending coils extending in relation to said mechanism and said springs thereby normally being non-flexible in opposite directions for resetting said actuator after a turn of said vehicle in either direction is completed but being flexible when said actuator is not resettable.

4. A directional turn indicator device comprising a base member, an electrical switch having alternately operable contact assemblies mounted therein, each assembly including opposing pairs of spring contacts and a ball member mounted for movement into and out of pressure engagement with cooperating contact members, an actuator pivotally mounted on said base for oscillation into alternative turn-indicating positions for operative engagement with one or the other of said ball members, and detent mechanism operatively associated with said base and said actuator for retaining said actuator in a neutral position or in one of its turn indicating positions against the pressure of said contacts, said detent mechanism including means for exerting release pressure on said actuator.

5. A directional turn indicator device comprising a base member, an electrical switch having alternately operable contact assemblies mounted therein, each assembly including opposing pairs of spring contacts and a ball member mounted for movement into and out of pressure engagement with cooperating contact members, an actuator pivotally mounted on said base for oscillation into alternative turn-indicating positions for operative engagement with one or the other of said ball members, detent mechanism operatively associated with said base and said actuator for retaining said actuator in a neutral position or in one of its turn indicating positions against the pressure of said contacts, and cancelling means mounted on said actuator for cooperation with a vehicle steering mechanism for resetting said actuator after a turn of said vehicle is completed, said detent mechanism including means for exerting release pressure on said actuator in aiding relation to said cancelling means.

6. A directional turn indicator device comprising a base member, an electrical switch having alternately operable contact assemblies mounted therein, each assembly including opposing pairs of spring contacts and a separate movable switch contact member mounted for movement into and out of pressure engagement with cooperating contact members, an actuator pivotally mounted on said base for movement into alternative turn indicating positions for operative engagement with one or the other of said separate movable switch contact members, biasing mechanism operatively associated with said base and said actuator for retaining said actuator in a neutral position or in one of its turn indicating positions against the pressure of said contacts, and cancelling means mounted on said actuator for cooperation with a vehicle steering mechanism for resetting said actuator after a turn of said vehicle is completed, said biasing mechanism including means for exerting release pressure on said actuator in aiding relation to said cancelling means.

7. A directional indicator device comprising a base member, an electrical switch having alternately operable contact assemblies mounted therein, an actuator pivotally mounted between its ends on said base for oscillation into alternative turn indicating positions for operative engagement with one or the other of said contact assemblies, said actuator having walled recesses adjacent each end thereof, mechanism operatively associated with said actuator for retaining it in a neutral position or in one of its turn indicating positions, and cancelling means comprising spring members mounted in each of said recesses, each spring member having one end anchored to said actuator adjacent the end wall of said recess, a coil portion connected to said one end by a crescent shaped portion and extending beyond the marginal edge of said actuator for cooperation with a vehicle steering mechanism for resetting said actuator after a turn of said vehicle is completed, and a bowed portion connected to said coil portion and lying in contact with the opposite wall of said recess whereby the coil portion of each spring flexes said crescent portion without moving said actuator in response to forces directed away from the pivot point of said actuator as said vehicle steering mechanism rotates in a vehicle turning direction and said bowed portion prevents movement of said coil portion relative to said actuator and moves said actuator in response to oppositely directed forces.

8. A directional indicator device comprising a base member, an electrical switch having alternately operable contact assemblies mounted therein, an actuator pivotally mounted between its ends on said base for oscillation into alternative turn indicating positions for operative engagement with one or the other of said contact assemblies, said actuator having a wall adjacent each end thereof, mechanism operatively associated with said actuator for retaining it in a neutral position or in one of its turn indicating positions, and cancelling means comprising escapement members mounted in each of said recesses, each escapement member having one end anchored to said actuator adjacent the end of said actuator, a dog portion connected to said one end by a crescent shaped resilient portion and extending beyond the marginal edge of said actuator for cooperation with a vehicle steering mechanism for resetting said actuator after a turn of said vehicle is completed, and a bowed portion connected to said dog portion and lying in contact with said wall of said recess whereby the dog portion of each escapement member flexes said crescent portion without moving said actuator in response to forces directed away from the pivot point of said actuator as said vehicle steering mechanism rotates in a vehicle turning direction and said bowed portion prevents movement of said dog portion relative to said actuator and moves said actuator in response to oppositely directed forces.

9. In a directional turn indicator switch, the combination comprising: a base of insulating material having ball moving channels; an actuator in said base having extension into said channels; posts extending into said base; resilient flat spring means extending from said posts; a conducting ball caged in each of said channels biased by selected of said flat springs into a normal position and being biased by said actuator extension into contact with other of said flat springs; a cover plate retaining said actuator; detents in said cover resiliently securing said actuator against movement; and resilient spring means extending from said actuator to return said actuator to normal position upon engagement with selected external forces.

10. In a directional turn indicator switch, the combination comprising a base having guiding means, an actuator mounted on said base over said guiding means, opposed pairs of contacts mounted adjacent to said guiding means, a conducting ball in said guiding means biased by a selected pair of said contacts into a normal position and being engaged by said actuator and biased thereby into contact with said other pair of contacts, detents supported by said base resiliently securing said actuator against movement, and resilient spring means extending from said actuator to return said actuator to normal position upon engagement with selected external forces.

References Cited in the file of this patent

UNITED STATES PATENTS

| | | |
|---|---|---|
| 1,912,824 | Cloke | June 6, 1933 |
| 2,276,411 | Moore | Mar. 17, 1942 |
| 2,347,342 | Thirlwell | Apr. 25, 1944 |
| 2,728,825 | Lincoln et al. | Dec. 27, 1955 |
| 2,800,541 | Brown et al. | July 23, 1957 |
| 2,848,573 | Barcus | Aug. 19, 1958 |